United States Patent
Jhon et al.

(10) Patent No.: US 9,825,421 B2
(45) Date of Patent: Nov. 21, 2017

(54) SINGLE PULSE LASER APPARATUS

(71) Applicant: Korea Institute of Science and Technology, Seoul (KR)

(72) Inventors: Young Min Jhon, Seoul (KR); Joon Mo Ahn, Seoul (KR); Seok Lee, Seoul (KR); Jae Hun Kim, Seoul (KR); Min Ah Seo, Seoul (KR); Chul Ki Kim, Seoul (KR); Taik Jin Lee, Seoul (KR); Deok Ha Woo, Seoul (KR); Min Chul Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/165,568

(22) Filed: May 26, 2016

(65) Prior Publication Data
US 2016/0352068 A1  Dec. 1, 2016

(30) Foreign Application Priority Data
May 26, 2015  (KR) ........................ 10-2015-0072797

(51) Int. Cl.
| | |
|---|---|
| *H01S 3/115* | (2006.01) |
| *H01S 3/11* | (2006.01) |
| *H01S 3/13* | (2006.01) |
| *H01S 3/127* | (2006.01) |

(52) U.S. Cl.
CPC ............ *H01S 3/1109* (2013.01); *H01S 3/115* (2013.01); *H01S 3/127* (2013.01); *H01S 3/1305* (2013.01)

(58) Field of Classification Search
CPC ............................... H01S 3/117; H01S 3/1109
USPC ............................................. 372/12, 10, 13
See application file for complete search history.

(56) References Cited

U.S. PATENT DOCUMENTS

| | | | |
|---|---|---|---|
| 6,418,154 B1 * | 7/2002 | Kneip | ..................... H01S 3/115 372/10 |
| 7,929,579 B2 | 4/2011 | Hohm et al. | |
| 2008/0273559 A1 * | 11/2008 | Grishin | ................. H01S 3/1103 372/25 |

(Continued)

FOREIGN PATENT DOCUMENTS

| | | | | |
|---|---|---|---|---|
| JP | 2014-103287 A | * | 6/2014 | ............. H01S 3/117 |
| KR | 10-1487271 B1 | * | 1/2015 | ............. A61B 18/20 |

OTHER PUBLICATIONS

Korean Office Action dated Aug. 23, 2016 in counterpart Korean Patent Application No. 10-2015-0072797 (5 pages, with English translation).

*Primary Examiner* — Tuan Nguyen
(74) *Attorney, Agent, or Firm* — NSIP Law

(57) ABSTRACT

Provided is a single pulse laser apparatus. The apparatus including a resonator having a first mirror, a second mirror, a gain medium, and electro-optic modulators (EOMs) which perform each mode-locking and Q-switching, the apparatus includes a photodiode which measures laser light that oscillates from the resonator, a synchronizer which converts an electrical signal generated by measuring the laser light into a transistor-transistor logic (TTL) signal, a delay unit which sets a latency determined in order to synchronize a mode-locked pulse with a Q-switched pulse to the TTL signal, and outputs a trigger TTL signal according to the latency, and a Q-driver which inputs the trigger TTL signal to the EOM which performs Q-switching, and causes the EOM to operates.

8 Claims, 6 Drawing Sheets

(56) References Cited

U.S. PATENT DOCUMENTS

| | | | | |
|---|---|---|---|---|
| 2009/0242522 A1* | 10/2009 | Baird | ............ | B23K 26/03 |
| | | | | 219/121.61 |
| 2011/0019705 A1* | 1/2011 | Adams | ............ | B23K 26/0622 |
| | | | | 372/25 |
| 2012/0250710 A1* | 10/2012 | Yoshino | ............ | H01S 3/0057 |
| | | | | 372/25 |
| 2014/0148680 A1* | 5/2014 | Kasamatsu | ............ | A61B 5/0095 |
| | | | | 600/407 |

* cited by examiner

SINGLE PULSE LASER APPARATUS

CROSS-REFERENCE TO RELATED APPLICATION

This application claims priority to and the benefit of Korean Patent Application No. 2015-0072797, filed on May 26, 2015, the disclosure of which is incorporated herein by reference in its entirety.

BACKGROUND

1. Field of the Invention

The present invention relates to a laser apparatus, and more particularly, to a single pulse laser apparatus capable of synchronizing a mode-locked signal with a Q-switched signal.

2. Discussion of Related Art

Recently, a treatment technique using a laser is widely being used, and a treatment apparatus using such a laser is being used in dermatology, ophthalmology, dentistry, surgery, and the like. A laser treatment apparatus used in the dermatology among these departments is generally used for treatment of lesions such as skin diseases which occurs in skin, or vascular diseases, and achieves a purpose of the treatment by irradiating the skin with a laser having a constant wavelength and intensity. Various types of lasers are used for the treatment in the dermatology. An alexandrite laser, which operates at 755 nm and is developed in 2012, is mainly used for treatment of dermatopathological pigmentation that occurs naturally, and tattoos, and uses picosecond pulses in order to maximize therapeutic effects while minimizing aftereffects. Further, a long pulsed ruby laser is used for hair removal. A neodymium-doped yttrium aluminum garnet (Nd:YAG) laser which operates at 1060 nm and a carbon dioxide ($CO_2$) laser which operates at 10.6 micrometer, and an argon laser which operates in a range of 488 nm to 514 nm are used for treatment of ectatic vessels.

Specifically, in the dermatology, the laser treatment apparatus is used to treat various dermatopathological diseases such as stain spots, other ectatic vascular diseases, and pigmentation diseases including tattoos. The laser treatment apparatus may allow localized heating so as to increase a temperature so that constituent proteins are denatured or pigment particles are dispersed. In this case, a pulse width and energy of laser irradiating light which is appropriate for treatment of skin wounds are important in medical lasers unlike in other research and industrial lasers. Specifically, energy should be focused on an output pulse as much as possible in order to maximize therapeutic effects, and to this end, a laser capable of outputting a single pulse is required.

In a conventional technique, a pulse picker method and a cavity dumping method are used to output a single picosecond pulse and high energy. However, when these methods are used, since high-speed high-voltage circuits are required, a burden of circuit designing and manufacturing costs and power consumption occurs, since output energy is small, there is a problem in that an amplifier should be used, and a system volume according to use of the amplifier increases and a burden of power consumption and costs caused by a high voltage supplied to the amplifier occurs.

In U.S. Pat. No. 7,929,579, a method of outputting a high energy single pulse by using only a single electro-optic modulator (EOM) and a cavity dumping method is disclosed. However, in this case, since a high-voltage EOM should be used, a burden of costs and power consumption resulting from a high-speed high-voltage driving circuit occurs, and both of mode-locking and Q-switching should be performed by using only a single EOM, there is a problem in that a burden of power consumption caused by a high voltage occurs. Further, high-speed high-voltage switching circuits should be manufactured to perform both of the mode-locking and the Q-switching using a high-voltage EOM. In addition, since a high energy picosecond single pulse may be output, there is no need to use an amplifier, but since the mode-locking is not completely implemented, there is a limit to make one shot pulse.

DOCUMENT OF PRIOR ART

Patent Document (Patent Document 0001) U.S. Pat. No. 7,929,579

SUMMARY OF THE INVENTION

The present invention is directed to a single pulse laser apparatus in which a single pulse is output by calculating a correlation between a pulse width of a Q-switched signal and mode-locked signals and applying the correlation to a laser system, energy is focused on single pulse output laser light through a cavity dumping technique, and a picosecond pulse width of a continuous wave (CW) mode-locked signal is applied to an output beam through a prelasing method.

According to an aspect of the present invention, there is provided a single pulse laser apparatus including a resonator having a first mirror, a second mirror, a gain medium, and electro-optic modulators (EOMs) which perform each mode-locking and Q-switching, the apparatus including a photodiode which measures laser light that oscillates from the resonator, a synchronizer which converts an electrical signal generated by measuring the laser light into a transistor-transistor logic (TTL) signal, a delay unit which sets a latency determined in order to synchronize a mode-locked pulse with a Q-switched pulse to the TTL signal, and outputs a trigger TTL signal according to the latency, and a Q-driver which inputs the trigger TTL signal to the EOM which performs Q-switching, and causes the EOM to operate.

Preferably, the apparatus may further include a controller which monitors a pulse width and pulse energy of laser light output from the resonator, and determines the latency.

Preferably, the controller may determine a duration time in which the trigger TTL signal is continued.

Preferably, the apparatus may further include a power supply which supplies energy to the gain medium, and inputs a synchronization TTL signal which is output when a lamp is pumped to the delay unit.

Preferably, the EOM which performs mode-locking may prelase laser light having a specific picosecond pulse width.

Preferably, the controller may determine the latency based on a relationship between a round trip time between the prelased pulses and a pulse width of a Q-switched pulse.

Preferably, the apparatus may further include an etalon which adjusts a pulse width of the laser light.

Preferably, the etalon may be an optical device having reflectivity which is improved by depositing a dielectric multi-layer thin film on one surface or both surfaces of a parallel plate of glass or crystal serving as a parallel plate having a constant reflectivity, and the pulse width of the laser light may be adjusted by reflectivity, a thickness, and a refractive index of the etalon by limiting a transmission wavelength band thereof when the laser light is transmitted through the etalon.

Preferably, the etalon may be at least one etalon and may adjust the pulse width of the laser light by selectively using etalons having different characteristics from inside or outside of the resonator.

Preferably, the pulse width of the laser light may be adjusted within a range of 100 ps to 1 ns.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the invention will be described in detail with reference to the accompanying drawings. However, the following embodiments, which are provided in order to fully explain the invention for those skilled in the art, may be modified in several different forms, and the scope of the present invention is not limited to the embodiments to be described below.

Also, main factors of a laser for skin treatment include pulse energy, a pulse width, a picosecond, a laser wavelength, Q-switching, mode-locking, a single pulse, cavity dumping, and the like.

Figure 1:
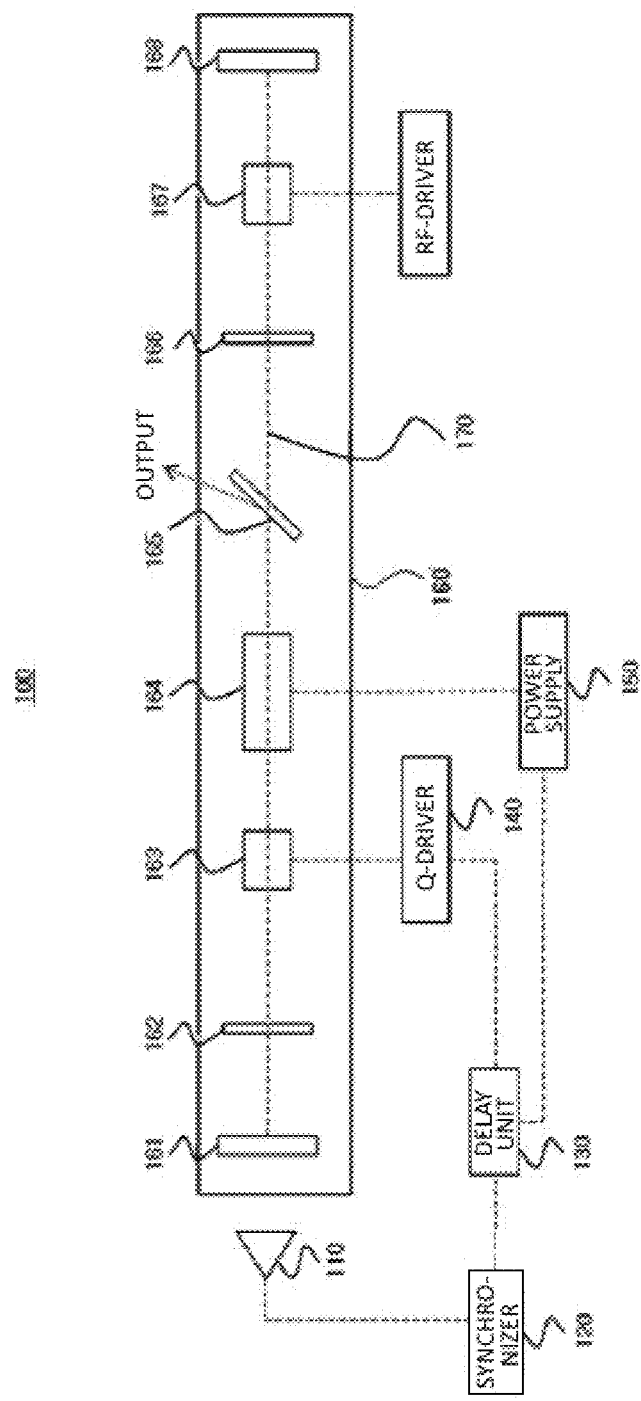
FIG. 1 is a block diagram illustrating a single pulse laser apparatus according to an embodiment of the present invention.

FIG. 1 is a block diagram illustrating a single pulse laser apparatus according to an embodiment of the present invention.

Referring to FIG. 1, a single pulse laser apparatus 100 includes a photodiode 110, a synchronizer 120, a delay unit 130, a Q-driver 140, a power supply 150, and a resonator 160, and the resonator 160 includes a first mirror 161, a waveplate 162, an electro-optic modulator (EOM) 163 which performs Q-switching, a gain medium 164, a linear polarizer 165, an etalon 166, an EOM 167 which performs mode-locking, and a second mirror 168.

In an embodiment, the EOMs 163 and 167 which perform the Q-switching and the mode-locking, respectively, may be each configured of an EOM or an acousto-optic modulator. Here, the acousto-optic modulator does not require a specific high-speed high-voltage circuit designing and manufacturing, does not use a high voltage, and uses a low-voltage radio frequency (RF), and thus there is an advantage in power consumption and costs. Further, in the present invention, since the EOMs 163 and 167 are configured of the EOM or the acousto-optic modulator, a Q-switched and mode-locked pulse which is a single pulse may be output.

Hereinafter, first, the first mirror 161, the waveplate 162, the EOM 163 which performs Q-switching, the gain medium 164, the linear polarizer 165, the etalon 166, the EOM 167 which performs mode-locking, and the second mirror 168, which are included in the resonator 160, will be described.

The first mirror 161 and the second mirror 168 are disposed at both ends of the resonator 160. Both the first mirror 161 and the second mirror 168 are total reflection mirrors having reflectivity of 99.9% or more in order to implement a cavity dumping method.

The waveplate 162 may adjust intensity of pulses generated in the resonator 160, and in an embodiment, a quarter-wave ($\lambda/4$) plate may be used.

The gain medium 164 is a material in which a population inversion may occur through pumping, and light incident on the material from the outside is amplified and output as high intensity light. A flash lamp, an arc lamp, or other lasers may be used externally as a pumping device. An alexandrite or titanium-doped sapphire crystal rod, a neodymium-doped yttrium aluminum garnet (Nd:YAG) crystal rod, and the like may be used as the gain medium 164.

For example, when light is incident on the gain medium 164 using a pump lamp, light excited in the gain medium 164 passes through the etalon 166 along an optical axis 170 and is reflected by the second mirror 168. Light which sequentially passes through the etalon 166, the gain medium 164, and the EOM 163 along the optical axis 170 is reflected by the first mirror 161 again.

The linear polarizer 165 outputs laser light that oscillates from the resonator 160.

The EOM 167 which performs mode-locking prevents oscillation from occurring by making a mode-locking state and maximizing cavity loss by the waveplate 162 and the linear polarizer 165, and pumping energy is stored in the gain medium 164.

The etalon 166, which serves to adjust a pulse width of laser light, is an optical device having reflectivity which is improved by depositing a dielectric multi-layer thin film on a typically parallel plate of glass or crystal serving as a parallel plate having a constant reflectivity or both surfaces of the parallel plate. Hereinafter, the etalon 166 will be described in more detail with reference to FIG. 6.

Hereinafter, the photodiode 110 for generating single pulse laser light based on laser light that oscillates from a resonator, the synchronizer 120, the delay unit 130, the Q-driver 140, and the power supply 150 will be described.

The photodiode 110 measures the laser light that oscillates from the resonator, generates an electrical signal corresponding to the measured laser light, and inputs the electrical signal to the synchronizer 120.

The synchronizer 120 converts the electrical signal input from the photodiode 110 into a transistor-transistor logic (TTL) signal. Then, the synchronizer 120 inputs the TTL signal to the delay unit 130.

The delay unit 130 sets a latency to the TTL signal input from the synchronizer 120, and outputs a trigger TTL signal to the Q-driver 140. Here, the latency is determined through a controller in order to synchronize a mode-locked pulse with a Q-switched pulse.

The Q-driver 140 receives the trigger TTL signal delayed by a predetermined latency from the delay unit 130, provides a voltage (V) to the EOM 163 which performs Q-switching, and causes the EOM 163 to operate to perform Q-switching.

Further, although not illustrated in the drawings, the controller monitors a pulse width and pulse energy of the laser light output from the resonator, and determines a latency. For example, the controller may determine the latency based on a time at which the pulse width of the output laser light is formed smaller than a preset reference and the pulse energy thereof is formed greater than a preset reference. Also, the controller may provide a determined latency to the delay unit 130, and the delay unit 130 may set a corresponding latency to a trigger TTL signal, delay by the corresponding latency, and then provide the trigger TTL signal to the Q-driver 140.

In an embodiment, the controller may determine a duration time in which the trigger TTL signal is continued.

The power supply 150 supplies energy to the gain medium 164, and inputs a synchronization TTL signal, which is output when a lamp is pumped, to the delay unit 130. Further, the lamp may be pumped by using power supplied from the power supply 150, pumped light may be incident on the gain medium 164, and energy required to generate laser light may be supplied.

Referring to a flow of a signal with reference to FIG. 1, the photodiode 110 measures laser light that oscillates from the resonator 160, and inputs an electrical signal to the synchronizer 120. The synchronizer 120 converts the electrical signal into a TTL signal, and inputs the TTL signal to the delay unit 130.

The delay unit 130 generates a trigger TTL signal after delaying by the preset latency, and inputs the trigger TTL signal to the Q-driver 140. When the trigger TTL signal is generated after delaying by the preset latency, a mode-locked pulse may be synchronized with a Q-switched pulse, and thus a single pulse may be output.

Further, the delay unit 130 may receive a synchronization TTL signal, which is output when the power supply 150 pumps a lamp, from the power supply 150, and input the trigger TTL signal to the Q-driver 140.

The Q-driver 140 may be driven by receiving the trigger TTL signal, and may cause the EOM 163 which performs Q-switching to operate.

Figure 2:
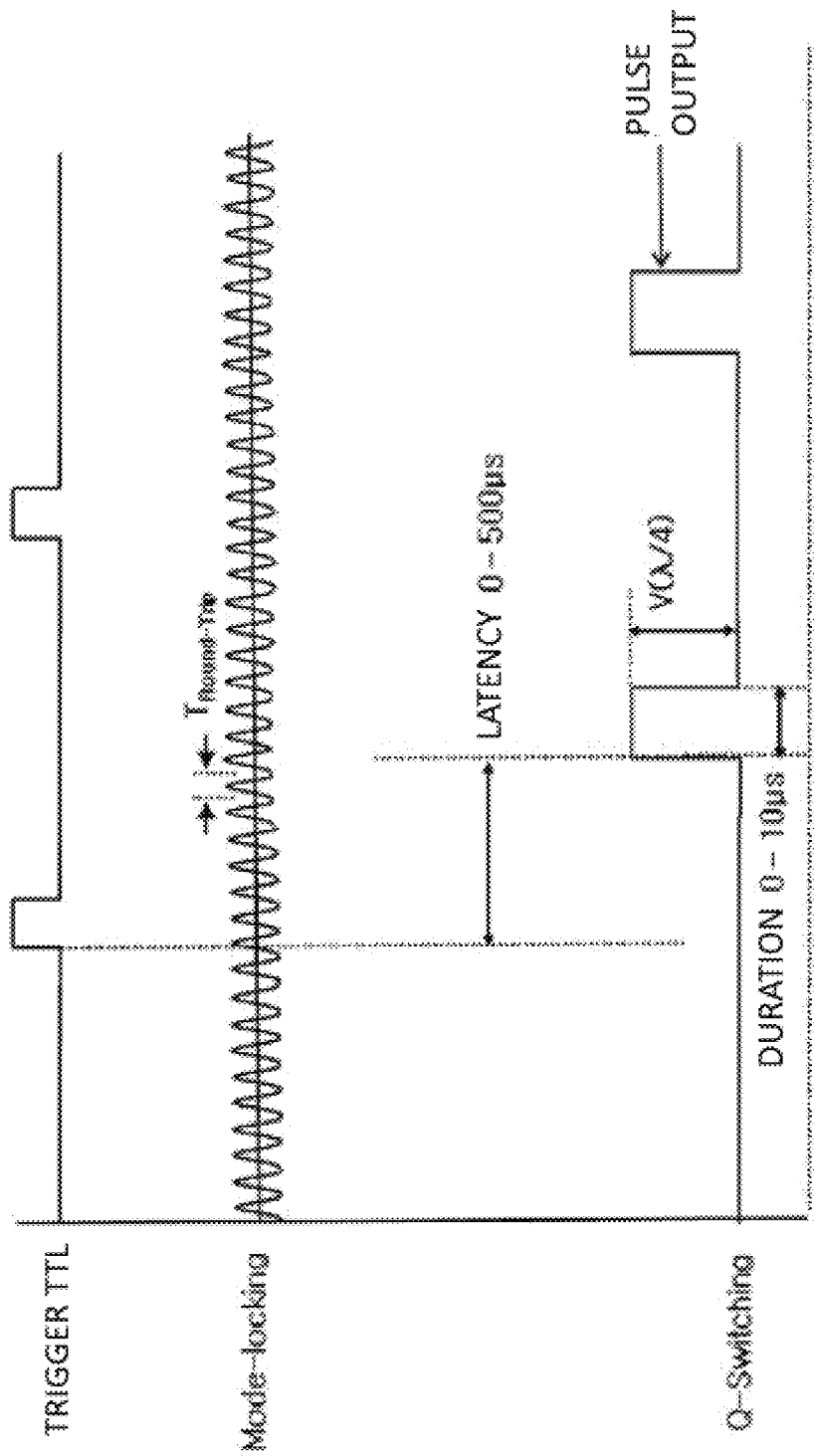
FIG. 2 is a graph illustrating a process of performing Q-switching according to a trigger transistor-transistor logic (TTL) signal.

FIG. 2 is a graph illustrating a process of performing Q-switching according to a TTL signal.

First, the EOM 167 which performs mode-locking operates continuously to have constant amplitude and frequency from the beginning. More specifically, the waveplate 162 may be adjusted so that a mode-locked pulse having very small intensity is generated in the resonator 160, and thus a prelased state may be made.

Further, since a pulse width of the prelased pulse is adjusted to a value in a range of 100 ps to 1 ns by the etalon 166 and both the first and second mirrors 161 and 168 are total reflection mirrors having reflectivity of 99.9% or more, a beam does not pass to the outside of the resonator 160 and thus all pumping energy is stored in the resonator 160.

As described with reference to FIG. 1, when a trigger TTL signal is input to the Q-driver 140, the Q-driver 140 cause the EOM 163 to operate by providing a voltage to the EOM 163 which performs Q-switching, and allows the Q-switching to be performed.

More specifically, a latency may be determined through the controller, and the controller may determine a latency based on a predetermined time at which a pulse width is smaller than a predetermined reference and pulse energy is greater than a predetermined reference while monitoring a pulse width and pulse energy of output laser light through an oscilloscope. In an embodiment, functions of the controller may be performed based on data input from the outside by a user, or may be automatically performed in the controller. That is, the controller may provide the latency to the delay unit 130 by directly performing monitoring and determining the latency or may provide the latency input by the user to the delay unit 130.

Further, the controller may also set a duration time in which the trigger TTL signal should be continued, and may provide the duration time to the delay unit 130.

Figure 3:
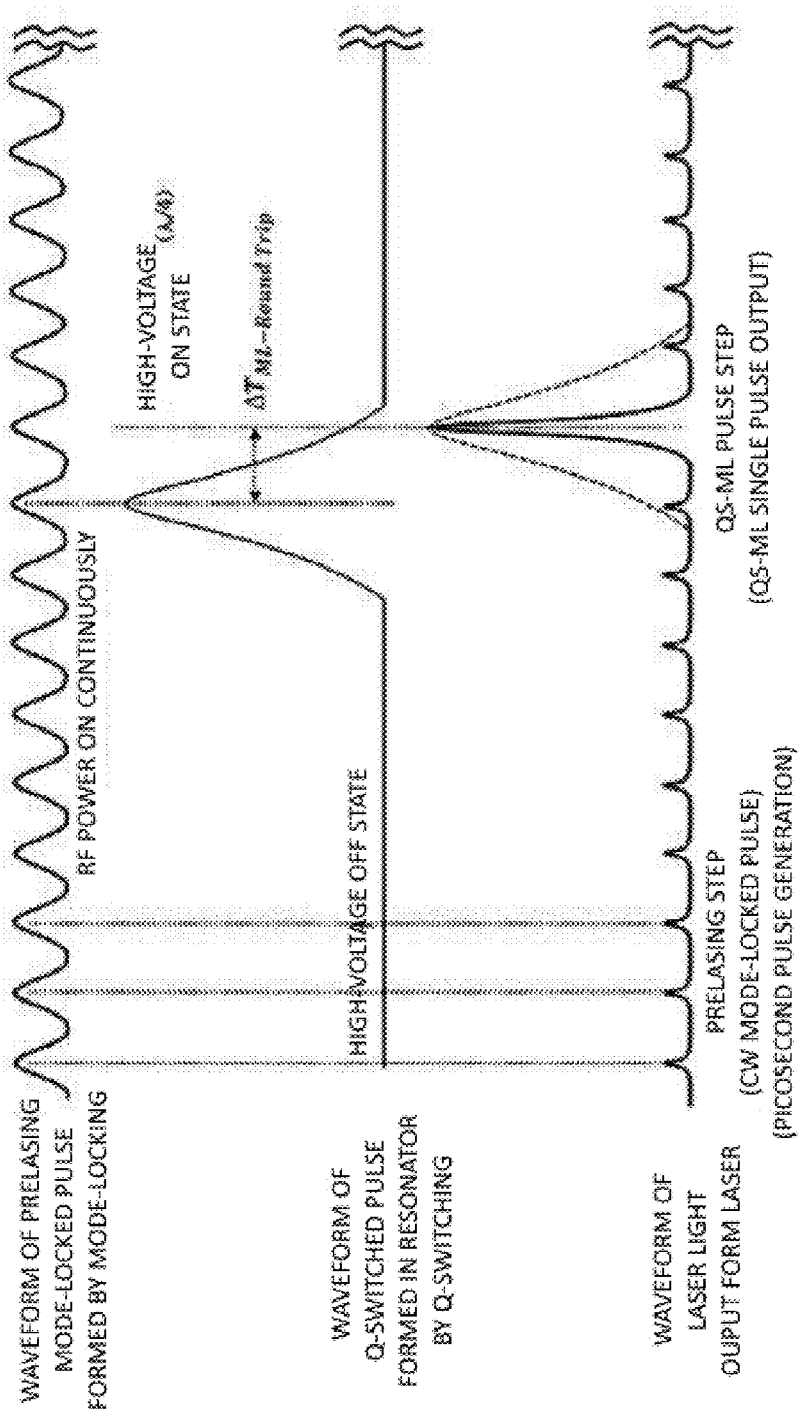
FIG. 3 is a graph illustrating single pulses which are output through a mode-locking signal and a Q-switched signal.

FIG. 3 is a graph illustrating single pulses which are output through a mode-locking signal and a Q-switched signal.

First, as described with reference to FIG. 2, the EOM 167 which performs mode-locking operates continuously to have constant amplitude and frequency from the beginning. That is, as an RF-driver operates, the EOM 167 oscillates laser light having a picosecond pulse width in advance by prelasing.

Also, the resonator 160 is designed and manufactured based on a relationship between an interval between mode-locked pulses (an ML-round trip time) and a pulse width of a Q-switched pulse (a QS-pulse width), a latency of a trigger TTL signal is determined, an operation of Q-switching is matched to a moment at which the prelased pulse passes, and thus single pulse laser light is output.

More specifically, the latency of the trigger TTL signal is determined by the following Equation 1.

$$\Delta\tau_{QS\text{-}Pulse\ Width} \approx n \cdot \Delta T_{ML\text{-}Round\ Trip} \ (n \leq 5) \qquad \text{[Equation 1]}$$

Here, $\Delta\tau_{QS\text{-}Pulse\ Width}$ represents a variable for a Q-switched pulse width, $\Delta T_{ML\text{-}Round\ Trip}$ represents a round trip time of mode-locking, and Equation 1 represents that the variable for the Q-switched pulse width is a multiple of the round trip time of the mode-locking.

Referring to a process of generating single pulse laser light with reference to FIG. 3, while the prelased pulses reciprocate continuously the resonator 160, energy is fully charged into the gain medium 164 due to cavity loss, population inversion becomes more than a preset reference, and the energy is fully charged. Then, at a moment at which the prelased pulses pass the EOM 163 which performs Q-switching, the EOM 163 operates, and the Q-switching is performed. That is, the delay unit 130 should input the trigger TTL signal to the Q-driver 140 after delaying the trigger TTL signal by precision of several tens to several hundreds of ns so that the prelased pulses pass at a moment at which the Q-switching is fully performed.

When a time at which the Q-switching is fully performed is matched to a time at which the prelased pulse pass, all the fully charged energy is output to the gain medium 164, almost all of the energy is charged into a single pulse, the single pulse reciprocates inside of the resonator once, and then is output by the linear polarizer 165. Here, the output of the single pulse is because the Q-switching is performed while the single pulse reciprocates once, the polarization of the beam is originally performed at λ/4 twice in horizontal polarization, the horizontal polarization is changed back to vertical polarization, and the single pulse does not pass through the linear polarizer and is all reflected to the outside.

In the present invention, in this manner, since a picosecond single pulse is generated using a relationship between a pulse width of a Q-switched pulse and mode-locked pulses, a pulse picker method may not be used.

Figure 4:
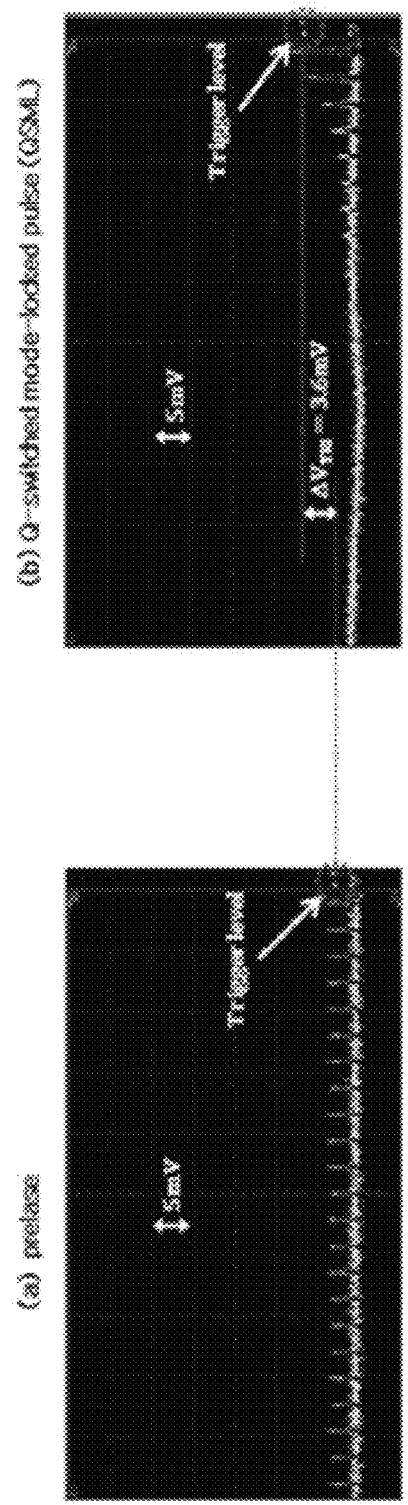
FIG. 4 is a graph illustrating a pulse in a prelased state and a Q-switched and mode-locked pulse.

FIG. 4 is a graph illustrating a pulse in a prelased state and a Q-switched and mode-locked pulse.

A drawing (a) of FIG. 4 is a view illustrating the pulse in the prelased state, which is measured by setting a small trigger level, and a drawing (b) of FIG. 4 is a view illustrating a beginning portion of the Q-switched and mode-locked pulse which is measured by increasing the trigger level.

That is, referring to FIG. 4, when Q-switching and mode-locking are performed while prelasing is performed, it may be seen that single pulse laser light having large energy is generated.

Figure 5:
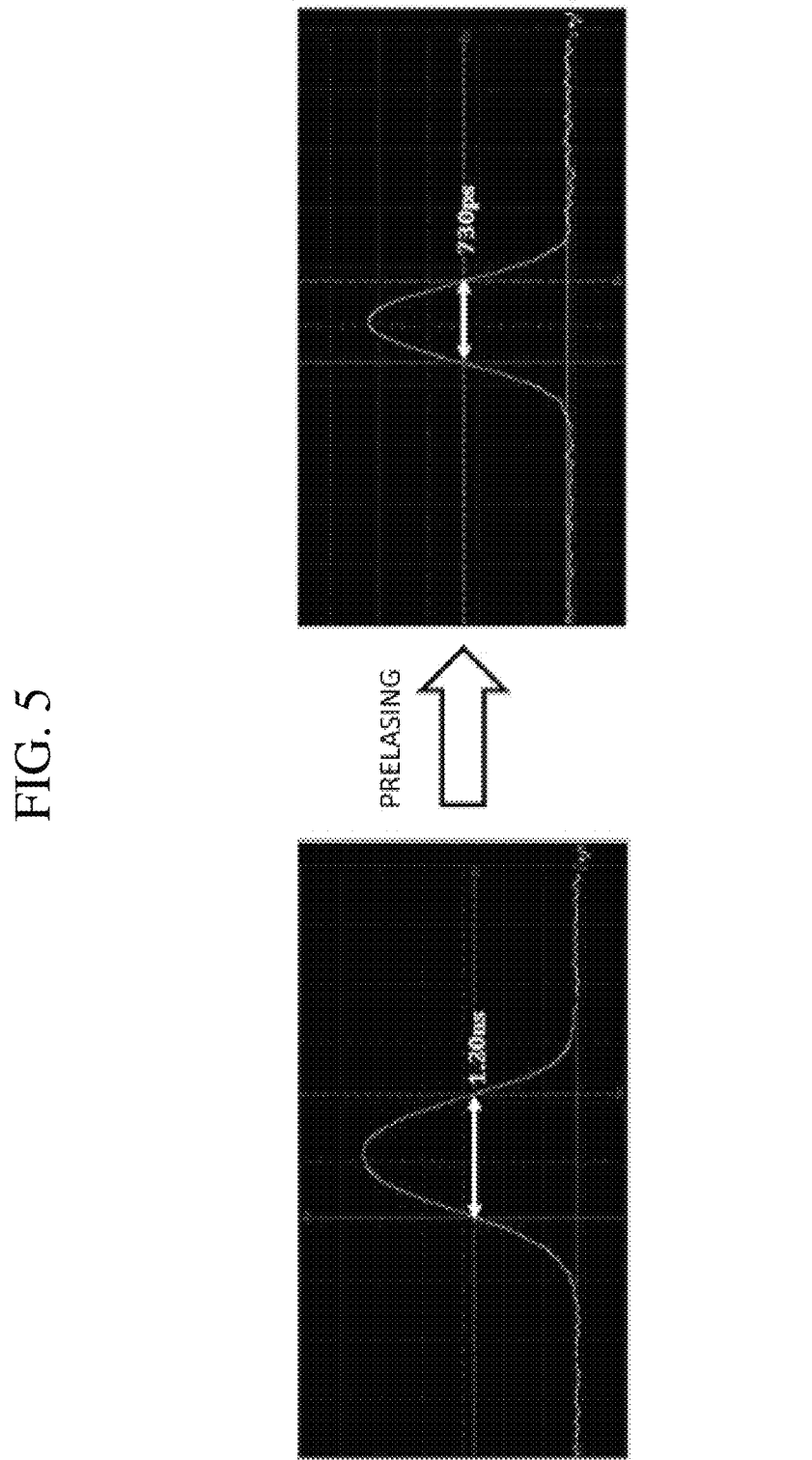
FIG. 5 is a graph illustrating pulse widths which are changed by prelasing.

FIG. 5 is a graph illustrating pulse widths which are changed by prelasing.

Referring to FIG. 5, when a pulse width of a pulse on which Q-switching and mode-locking are performed without prelasing is compared with a pulse width of a Q-switched and mode-locked pulse generated using a prelasing method, it may be seen that the pulse width of the pulse generated by the prelasing method is formed smaller than the pulse width of the pulse generated without the prelasing.

That is, using the prelasing method in which continuous wave (CW) lasing is performed in advance before the performing of the Q-switching, a picosecond pulse width of the prelased CW mode-locked pulse is applied to an output beam, and thus the pulse width thereof is formed smaller.

Accordingly, single pulse laser light having a small pulse width and high energy may be formed, and thus laser light may be focused on a local area.

Figure 6:
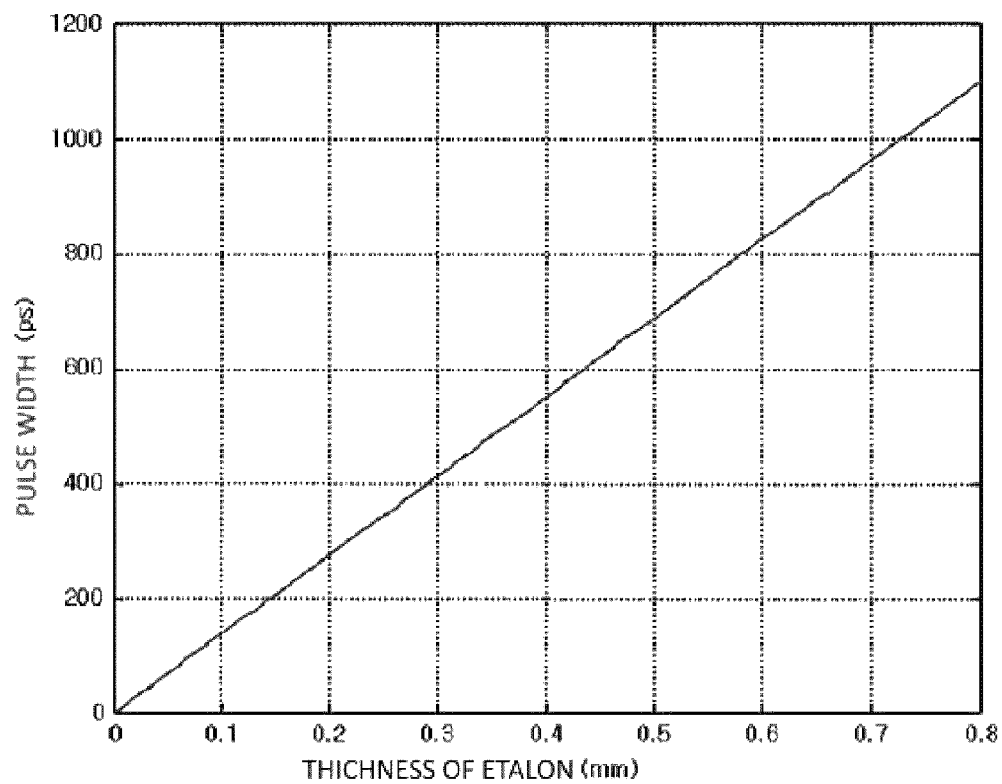
FIG. 6 is a graph illustrating a pulse width which is changed according to a thickness of an etalon.

FIG. 6 is a graph illustrating a pulse width which is changed according to a thickness of an etalon.

A pulse width of a Q-switched and mode-locked pulse after prelasing may be adjusted to a pulse width of 1 ns or more using the etalon 166, and etalons 166 having various thicknesses may be used to adjust the pulse width.

More specifically, when laser light is transmitted through the etalon 166, a transmission wavelength band of the laser light is limited by reflectivity, a thickness, and a refractive index of the etalon 166, and thus a pulse width thereof is adjusted.

Here, a degree of freedom of the pulse width of the laser light may be increased by adjusting the number of the etalons 166. For example, preferably, a pulse width of a medical laser may be freely adjusted within a range of 100 ps to 1 ns.

When the etalon 166 is disposed outside the resonator 160 (extra-cavity), laser passes once while being outputted, and thus an effect on forming of a desired pulse width may be obtained by very high reflectivity. On the other hand, when the etalon 166 is installed inside the resonator 160 (intra-cavity), laser fully reciprocates inside the resonator 160 even using a simple parallel plate type of the etalon 166 without a dielectric thin film on both surfaces thereof and having reflectivity of approximately 4%, and thus the same effect as that of the etalon having high reflectivity, which is installed outside the resonator 160, may be obtained.

Accordingly, a pulse width for treatment may be appropriately selected.

According to the above-described single pulse laser apparatus in the present invention, a single pulse is output by calculating a correlation between a pulse width of a Q-switched signal and mode-locked signals and applying the correlation to a laser system, and thus it is advantageous in that a pulse picker method may not be used.

Further, according to the present invention, energy can be focused on single pulse output beam through a cavity dumping technique, and a picosecond pulse width of a CW mode-locked signal can be applied to an output beam through a prelasing method.

Further, since energy is sufficiently obtained from a laser resonator, it is advantageous in that an amplifier may not be used.

Further, since specific high-speed high-voltage circuit designing and manufacturing for a single pulse output is not required, costs thereof can be reduced, and since it is possible to output a single pulse having a picosecond pulse width, the above-described single pulse laser apparatus can be applied not only to a medical apparatus but also to an industrial apparatus that requires high peak power.

Further, the above-described single pulse laser apparatus can appropriately set a pulse width and energy of an output beam using an etalon according to a therapeutic purpose, and can be applied not only to an alexandrite laser but also to other solid-state lasers.

Although exemplary embodiments of the above-described single pulse laser apparatus according to the present invention has been described, the present invention is not limited thereto, and may be modified in several different forms within the scope of the appended claims, detailed description of the present invention, and the accompanying drawings, that fall within the present invention.

What is claimed is:

1. A single pulse laser apparatus comprising a resonator comprising a first mirror, a second mirror, a gain medium, and an electro-optic modulator (EOM) configured to perform mode-locking and Q-switching, the apparatus comprising:
   a photodiode configured to measure laser light that oscillates from the resonator;
   a synchronizer configured to convert an electrical signal generated by measuring the laser light into a transistor-transistor logic (TTL) signal;
   a delay unit configured to set a latency to synchronize a mode-locked pulse with a Q-switched pulse to the TTL signal, and output a trigger TTL signal according to the latency;
   a Q-driver configured to input the trigger TTL signal to the EOM, and cause the EOM to operate; and
   a controller configured to monitor a pulse width and pulse energy of the laser light oscillating from the resonator, and determine the latency based on a relationship between a round trip time between prelased pulses and a pulse width of a Q-switched pulse.

2. The apparatus of claim 1, wherein the controller is further configured to determine a duration time in which the trigger TTL signal is continued.

3. The apparatus of claim 1, further comprising a power supply configured to supply energy to the gain medium, and output a synchronization TTL signal to the delay unit, in response to the power supply supplying energy to the gain medium.

4. The apparatus of claim 1, wherein the EOM is further configured to and prelase the laser light.

5. The apparatus of claim 1, further comprising an etalon configured to adjust the pulse width of the laser light.

6. The apparatus of claim 5, wherein
   the etalon comprises an optical device comprising a dielectric multi-layer thin film deposited on one or more surfaces of a parallel plate of glass or crystal configured as a parallel plate comprising a constant reflectivity; and
   the pulse width of the laser light is adjusted by reflectivity, a thickness, and a refractive index of the etalon by limiting a transmission wavelength band of the laser light when the laser light is transmitted through the etalon.

7. The apparatus of claim 5, wherein the etalon is configured to adjust the pulse width of the laser light by selectively using etalons comprising different characteristics.

8. The apparatus of claim 5, wherein the etalon is further configured to adjust the pulse width of the laser light within a range of 100 ps to 1 ns.

\* \* \* \* \*